(No Model.) 2 Sheets—Sheet 1.
G. VALIANT & C. DANCEL.
EMBOSSING MACHINE.
No. 441,263. Patented Nov. 25, 1890.
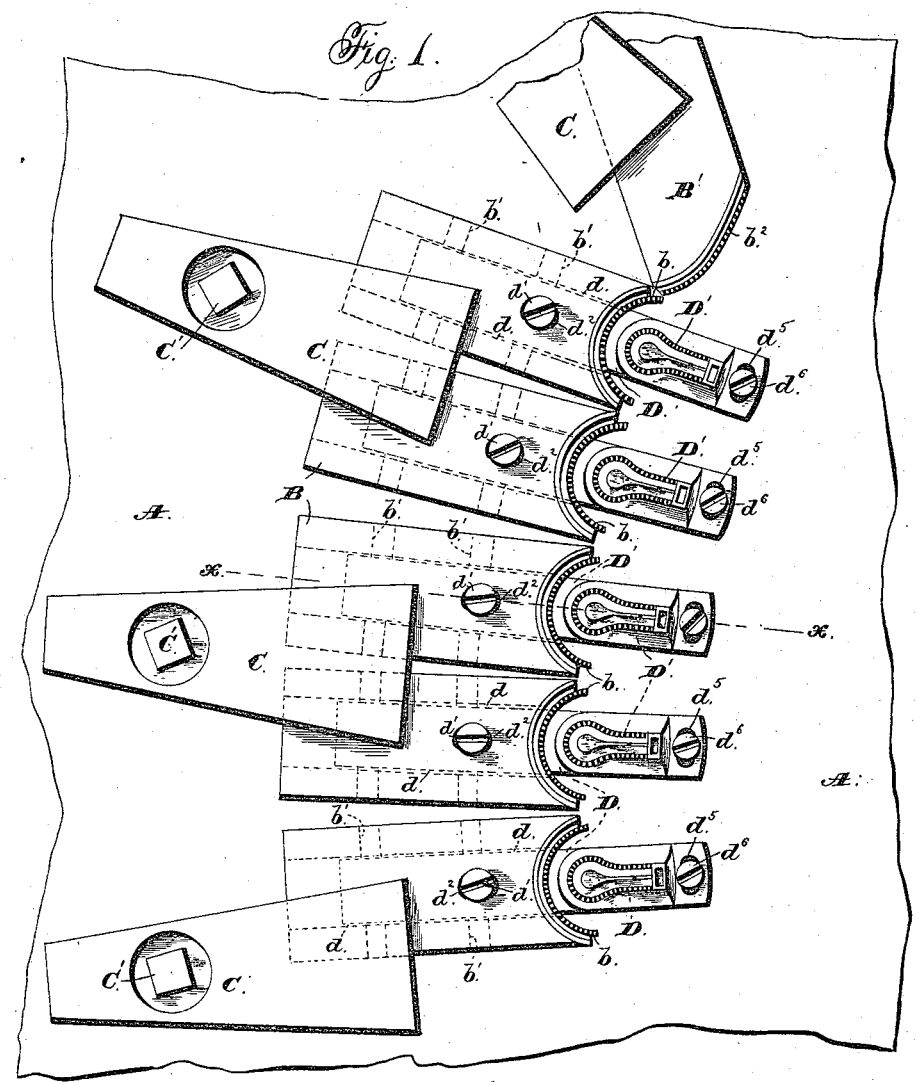
Fig. 1.
Fig. 2.
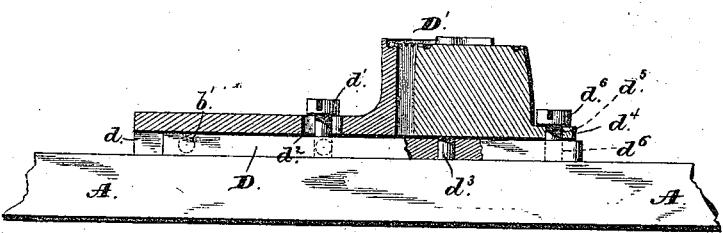
Witnesses:
Jas. E. Hutchinson
Henry C. Hazard
Inventors:
George Valiant and
Christian Dancel
by Hindle and Russell
Attorneys (No Model.) 2 Sheets—Sheet 2.

G. VALIANT & C. DANCEL.
EMBOSSING MACHINE.

No. 441,263. Patented Nov. 25, 1890.

UNITED STATES PATENT OFFICE.

GEORGE VALIANT, OF TORONTO, CANADA, AND CHRISTIAN DANCEL, OF NEW YORK, N. Y.

EMBOSSING-MACHINE.

SPECIFICATION forming part of Letters Patent No. 441,263, dated November 25, 1890.

Application filed September 21, 1887. Renewed April 25, 1890. Serial No. 349,439. (No model.)

*To all whom it may concern:*

Be it known that we, GEORGE VALIANT, of Toronto, county of York, Province of Ontario, Canada, and CHRISTIAN DANCEL, of New York city, in the county of New York, and in the State of New York, have invented certain new and useful Improvements in Embossing-Machines; and we do hereby declare that the following is a full, clear, and exact description thereof, reference being had to the accompanying drawings, in which—

Figure 3:
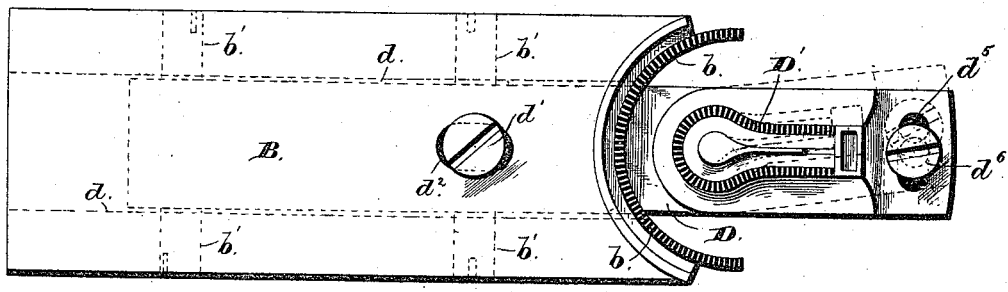

Figure 1 shows a plan view of our fly-embossing mechanism; Fig. 2, an enlarged section of the same on line $x$ $x$ of Fig. 1; Fig. 3, a detail plan view of one of the adjustable scallop-embossers with the slide carrying the adjustable button-hole-embossing piece, said piece being shown in dotted lines as adjusted to stand at an angle to the slide and the scallop-embosser; and Fig. 4, a plan view of a portion of a button-hole fly embossed by our apparatus.

Letters of like name and kind refer to like parts in each of the figures.

The object of our invention is to provide an improved embossing mechanism or apparatus for embossing button-hole flies for boots or shoes; and to this end our invention consists in the apparatus or mechanism and in the construction, arrangement, and combination of the parts thereof, as hereinafter specified.

In our application, Serial No. 246,106, for United States patent, we show, describe, and claim apparatus for cutting or stamping out button-hole flies for boots or shoes, adapted to be adjusted to cut flies of any desired shape and curvature, with the button-holes cut at any required angles. As stated in said application, such an adjustable apparatus is most desirable, as the flies suitable for different boots or shoes vary greatly in size, curvature, and in the arrangement of the button-holes, and it would therefore be impossible or would involve very great expense to have a separate cutting or stamping device for each style or shape of fly.

Our fly-embossing apparatus, as described and covered in the present application, is, like our said cutting or stamping apparatus, made adjustable, so as to be capable of being easily and quickly adjusted and adapted to properly emboss a fly of any shape or curvature and with the button-holes standing at any desired angles with reference to the edge of the fly. It is designed particularly for use in connection with our adjustable cutting or stamping out mechanism, but is obviously also capable of use to advantage in embossing flies cut out by other devices and in other ways.

In the drawings, A designates the supporting table or surface, which can be of any desired material or form. Upon this table are the series of blocks B B, adjustably held in place by the clamps C C, which are provided with arms or plates engaging the upper faces of the blocks so as to press or clamp said blocks firmly against the table-surface. Set-screws C' C', extending through the main portions of the clamps into the table, serve to hold the clamp-arms down in place with the desired pressure, and can be easily loosened when the blocks B B are to be unclamped and moved or adjusted. Each block B is provided at $b$ with a die for embossing, as desired, a portion of the outer edge of the fly with a line of imitation stitching and with a bead, where desired.

As shown in the drawings, the die $b$ on each block B is arranged and adapted to emboss the line of stitching around the curved edge of one of the fly-scallops. Where the fly edge is not scalloped, but is otherwise curved or shaped, the dies on the separate blocks are to be correspondingly arranged and shaped to emboss each one a portion of the edge. A supplemental block B', with a die $b^2$ of proper curvature to emboss the curved edge of the fly beyond the series of scallops, is like blocks B B adjustably held in place by a clamp C with set-screw C'.

With the series of blocks B B and B' made ajustable, as described and shown, and each provided with a die for embossing a portion only of the fly edge our apparatus can obviously be quickly and readily adapted for embossing the entire edge of a fly of any desired curvature by properly adjusting said blocks and their dies with reference to each other. The several dies on the several blocks together make a continuous line of embossing all along the fly edge, the direction or curvature of which line can be varied to suit the curvature of the fly edge, as indicated above.

In order to provide for embossing the button-holes in the fly at the same time that the fly edge is embossed each of the blocks B B is provided with a slide D, working in a longitudinal groove $d$ on the under side of the block. On such slide is a die-block D′, having on its top the die, so formed as to emboss a line of stitching around the respective button-hole. Where, as in the drawings, each block B is intended and adapted to emboss one of the scallops on the fly edge, the slide D should be central with reference to the block, so that the button-hole-embossing die will come where the button-hole should be, opposite the middle portion of the scallop curve. As in different flies the button-holes are often placed at different distances from the scalloped edge, the slide D is made longitudinally adjustable with reference to the block. A set-screw $d'$ on the slide and a slot $d^2$ in the block enagaged by the screw enables the slide to be moved to bring the button-hole-embossing die nearer to or farther from the fly-edge die and to be fixed as moved or adjusted.

To provide for lateral adjustment of the embossing-die slide with reference to the block B, we contemplate making the groove $d$ wider than the slide and providing the set-screws $b'$ $b'$ on opposite sides of the block to engage with their inner ends the sides of the slide, as shown in the drawings. With this construction the slide cannot only be adjusted bodily toward one side or the other of the block B, but it can obviously, if desired, be set at a slight angle to the block and groove therein.

To provide for the proper adjustment of the button-hole-embossing die-blocks D′ D′ to suit the angle of the button-holes with reference to the fly edge, we pivot each die-block D′ to its respective slide by the pin or stud $d^3$, entering an opening in the slide. This pin is vertically below that portion of the die which coincides with the loop or enlarged part of the button-hole. A lug $d^4$ on the die-block D′ is provided with a slot $d^5$, engaging a set-screw $d^6$ on the slide D. The slot extends transversely with reference to the lug and is preferably curved from the pin $d^3$ as a center. With this construction, the screw being loosened, the die-block can be swung on its pivotal connection with slide D, so as to adjust the angle at which the die on its upper face stands with relation to the block B, carrying the edge-embossing die.

The table A can be a stationary one to be used in connection with any desired form of press to force the fly against the embossing-dies, or it can be made movable and connected with any means for actuating it to bring the embossing devices in contact with the fly suitably supported on a stationary or movable support.

We have shown in the drawings enough of the series of blocks and dies to properly emboss the outer edge and the button-holes of a considerable portion of a fly. From this it will be clearly understood that to provide for embossing the entire fly the series of blocks and dies need only to be continued along farther with the proper relative arrangement to correspond with the shape or curvature of the fly.

Figure 4:
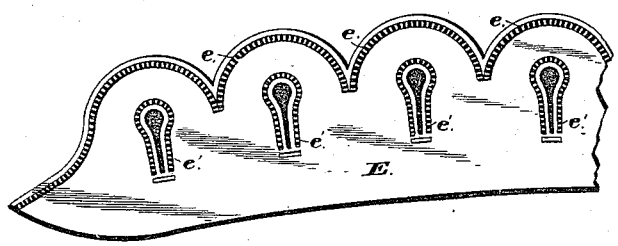

In Fig. 4 we have shown a portion of the fly E as it would be embossed by the portion of our apparatus shown, with the line of imitation stitching $e$ along its outer scalloped edge and the stitching $e'$ embossed around its button-holes.

The die-faces on the various dies of our apparatus can of course be varied in shape and configuration, as desired, so as to suit different flies or to emboss the fly differently.

We do not in this application claim or intend to cover by our claims any button-hole fly-cutting apparatus or anything shown, described, and claimed in our said other pending application, Serial No. 246,106.

Having thus described our invention, what we claim is—

1. In the herein-described apparatus for embossing flies for boots or shoes, a series of dies, each adapted to emboss a portion of the fly, such dies being made adjustable to change their angles with reference to each other, as desired, substantially as and for the purpose described.

2. In an apparatus for embossing flies for boots or shoes, a series of dies, each adapted to emboss a portion of the fly edge and all together adapted to emboss the whole of such edge, and a series of relatively-adjustable blocks or pieces carrying such dies, substantially as and for the purpose specified.

3. In a machine for embossing flies for boots or shoes, the series of adjustable blocks, each provided with a die shaped to emboss the edge of a scallop on the fly, and the supplemental block provided with a die adapted to emboss the curved edge of the fly beyond the scallops thereof, substantially as and for the purpose shown.

4. In an apparatus for embossing flies for boots or shoes, the block or piece provided with a die to emboss a portion of the fly edge and the block carrying a button-hole-embossing die adjustable with reference to the other die-carrying piece, substantially as and for the purpose described.

5. In combination with the block provided with a die to emboss a portion of the fly edge, a slide adjustably attached to such piece and a block on the slide provided with a button-hole-embossing die, substantially as and for the purpose specified.

6. In combination with the piece provided with the die to emboss a portion of the edge of a fly for boots or shoes, a button-hole die made adjustable to and from the edge-die and also in its angular relation to such die, substantially as and for the purpose shown.

7. In combination with the piece provided with the die for a portion of the fly edge, the slide, the button-hole die pivoted to the slide, and means, substantially as shown, for fixing such die at any adjustment on its pivot, substantially as and for the purpose set forth.

8. In combination with a block or piece provided with a die adapted to emboss the edge of a scallop on a button-hole fly, the button-hole die and adjustable connections between the two dies, so that the button-hole die can be adjusted toward or from the scallop-die and can be set at any desired angle with relation to such die, substantially as and for the purpose described.

9. In an embossing apparatus for flies for boots or shoes, a series of blocks or pieces, each provided with a die for embossing a portion of the fly edge, the series of adjustable slides, each connected with one of the die-carrying pieces, and the series of blocks adjustably attached to the respective slides and each provided with a die for embossing a button-hole on the fly, all substantially as and for the purpose specified.

In testimony that we claim the foregoing we have hereunto set our hands this 25th day of August, A. D. 1887.

GEORGE VALIANT.
CHRISTIAN DANCEL.

Witnesses:
ARTHUR H. SMITH,
W. A. HUNTER.